(12) United States Patent
Terry

(10) Patent No.: US 7,297,257 B1
(45) Date of Patent: Nov. 20, 2007

(54) CHEMICAL RELEASE SYSTEM

(75) Inventor: LeRoy Henery Terry, Sun Lakes, AZ (US)

(73) Assignee: Terry, LLC, Chandler, AZ (US)

( * ) Notice: Subject to any disclaimer, the term of this patent is extended or adjusted under 35 U.S.C. 154(b) by 0 days.

(21) Appl. No.: 11/419,732

(22) Filed: May 22, 2006

Related U.S. Application Data

(60) Provisional application No. 60/683,187, filed on May 20, 2005.

(51) Int. Cl.
*C02F 5/00* (2006.01)
(52) U.S. Cl. .................. 210/198.1; 422/278; 422/282; 137/268
(58) Field of Classification Search ............. 210/198.1, 210/205, 282, 287, 289, 416.1, 434, DIG. 6; 422/261, 274, 277, 278, 282; 137/268
See application file for complete search history.

(56) References Cited

U.S. PATENT DOCUMENTS

| 4,277,359 A | 7/1981 | Lipinski |
|---|---|---|
| 4,357,254 A | 11/1982 | Kapiloff et al. |
| 4,496,470 A | 1/1985 | Kapiloff et al. |
| 4,798,675 A | 1/1989 | Lipinski et al. |
| 5,045,211 A | 9/1991 | Hamilton |
| 5,178,181 A * | 1/1993 | Craig .......................... 137/268 |
| 5,259,409 A * | 11/1993 | Cervola ...................... 137/268 |
| 5,507,945 A * | 4/1996 | Hansen ..................... 210/198.1 |
| 5,552,057 A | 9/1996 | Hughes et al. |
| 5,730,178 A * | 3/1998 | Zhadanov et al. .......... 137/268 |
| 5,772,873 A * | 6/1998 | Hudgens et al. ............ 210/192 |
| 5,827,434 A | 10/1998 | Yando |

\* cited by examiner

*Primary Examiner*—Matthew O. Savage
(74) *Attorney, Agent, or Firm*—Booth Udall, PLC

(57) ABSTRACT

A mechanical release system and method for eliminating scale conditions in water are described. The mechanical release system may include a pressure vessel comprising a head that has a through hole extending from an inlet to an outlet on opposite sides of the head, the through hole divided by at least a circumferential partial rib into an inlet section and an outlet section. Implementations may work without restricting water flow or "water-starving" equipment and control water before it enters equipment and create a scale-eliminating environment within water for extended periods of time (e.g., up to six months or more).

6 Claims, 4 Drawing Sheets

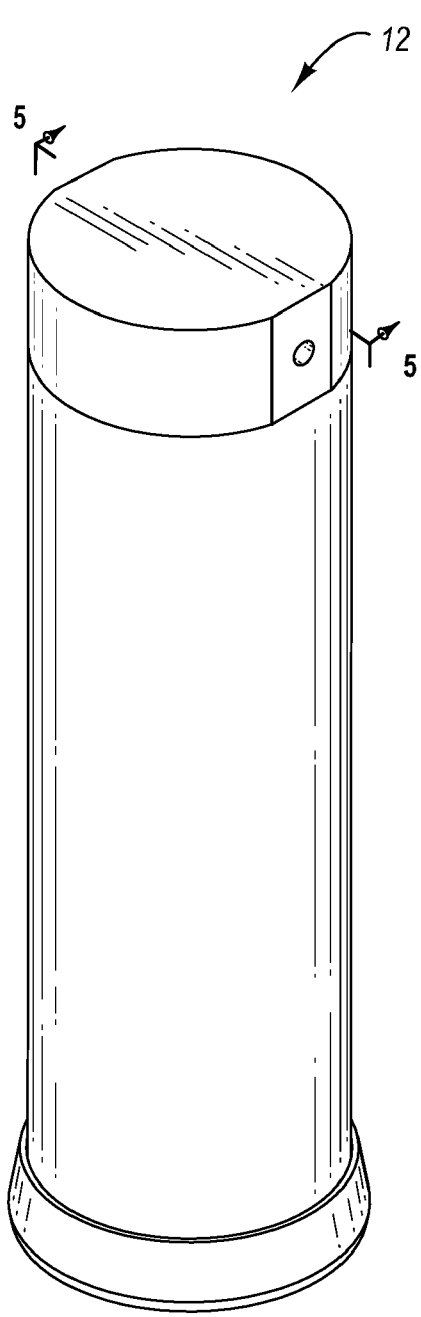
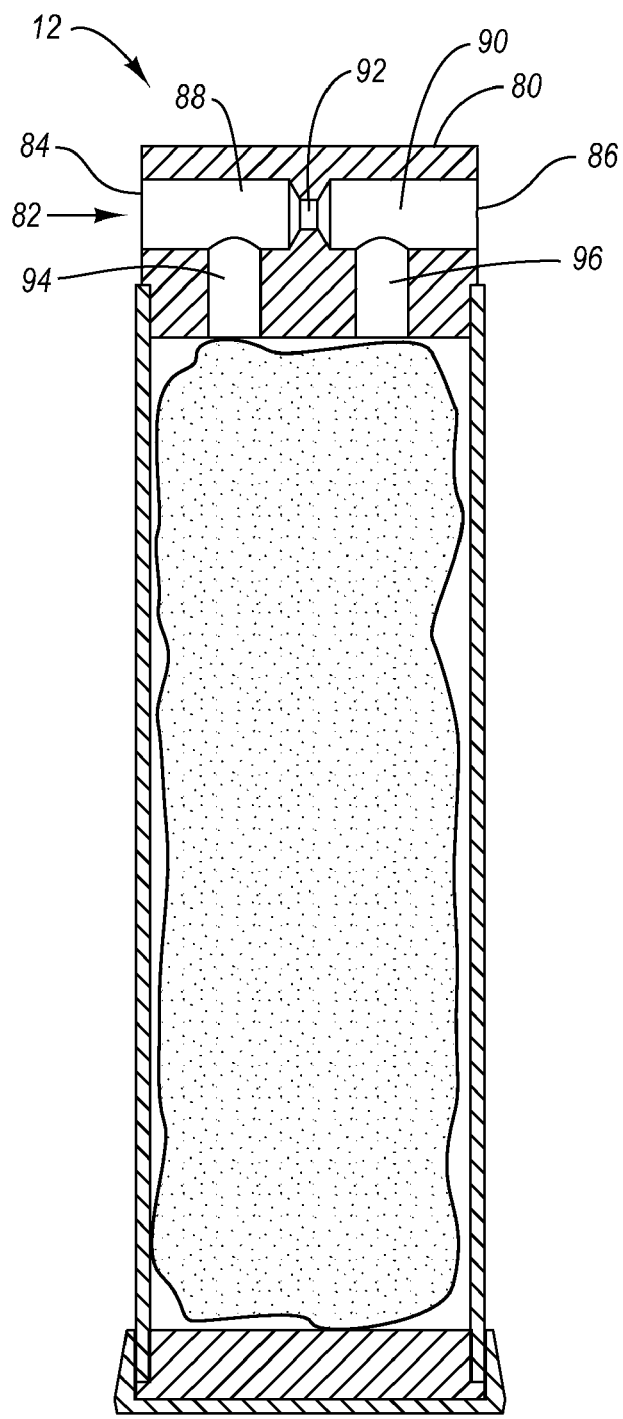
*Fig. 4*
*Fig. 5*

CHEMICAL RELEASE SYSTEM

CROSS REFERENCE TO RELATED APPLICATION

This application claims priority to U.S. Provisional Patent Application entitled "Mechanical Release System," Ser. No. 60/683,187, filed May 20, 2005, now abandoned, the disclosure of which is incorporated entirely herein by reference.

BACKGROUND

A. Technical Field

This document relates to a mechanical release system.

B. Background Art

Conventional mechanical or "sieve" filtration will typically provide a higher quality water output than a raw-water source, yet when scale-causing water chemistries are present, water will invariably produce damaging scale buildup. Scale is detrimental as it builds up on equipment surfaces because it reduces energy and mechanical efficiency in equipment.

Conventional filters only manage water to the degree of the quality of the filter. In most cases that quality is very poor. The water filtration industry sells water "polish" systems that require, in most cases, multiple filters that accumulate large investments. None of the filters actually control the water. Instead, conventional water filtration must evaluate existing water conditions and then suggest filters that best manage the problems.

Conventional water filters marginally affect water hardness. Alkalinity, calcium (e.g., calcium carbonate ($CaCO_3$)), magnesium, pH and/or total dissolved solids are the primary cause of scale buildup. Mechanical water filtration is unable to sieve out these scale causing water conditions. Only debris and particles large enough to be caught in mechanical filter barriers can be removed until they clog or have reached capacity. At that point, conventional water filters can become an additional problem to equipment by "dragging" on water supply lines merely through their function. Regardless of the degree of filtration, water flow is restricted.

SUMMARY

In an aspect, this document features a mechanical release system and method for eliminating scale conditions in water. The mechanical release system may include a pressure vessel comprising a head that has a through hole extending from an inlet to an outlet on opposite sides of the head, the through hole divided by at least a circumferential partial rib into an inlet section and an outlet section.

Implementations may include one or more of the following. The inlet section may have a first size and the outlet section may have a second size less than the first size of the inlet section. The through hole may be divided by full circumferential rib, in which case the inlet section may have a first size and the outlet section has a second size equal to the first size of the inlet section. The inlet and the outlet may be threaded. A pair of countersinks may be defined in opposite sides of the head, one countersink surrounding the inlet and the other countersink surrounding the outlet. The head may further define an inlet port and an outlet port on opposite sides of the circumferential partial or full rib extending downwardly from the inlet section and the outlet section respectively out a bottom of the head. The inlet port may have a first size and the outlet port may have a second size that is one of less than the first size of the inlet port and equal to the first size of the inlet port. The head may also further define one of a shoulder at a lower portion of the head and threads at a lower portion of the head. A body may also be included defining an internal cavity and opposing upper and lower end openings. The head may be coupled to the upper end opening of the body. An end plug may be coupled to the lower end opening of the body. Alternatively, the body and the end plug may be integrally joined together and form a unitary housing. A time-release pouch holding a composition that prevents the build-up of scale may be disposed within the internal cavity of the body. The head and the end plug may be generally cylindrical and the body may be annularly cylindrical. The head may further define one of a shoulder at a lower portion of the head and threads at a lower portion of the head. The end plug may define one of a shoulder at an upper portion of the end plug and threads at an upper portion of the end plug.

The foregoing and other aspects and implementations may have one or more or all of the following advantages. Implementations may work without restricting water flow or "water-starving" equipment. Implementations create a scale-eliminating environment within water for extended periods of time (e.g., up to six months or more). This differs from existing programs that provide inconsistent results or remove scale after the scale problem has occurred. Where conventional mechanical water filtration is unable to sieve out scale causing problems, implementations take control of scale causing problems, effectively eliminating scale concerns rather than only providing another "scale reducer" by just another water filter manufacturer. Implementations continuously protect equipment from hard scale water by controlling the water before it enters the equipment. There may be fewer equipment maintenance problems when using implementations, and equipment will not suffer continuous deterioration of performance due to scale buildup. Even though implementations may stop the scale buildup problem before it can start, if scale is already present, implementations may remove the scale buildup. Although implementations have the ability to be applied as a stand-alone scale eliminating technology, implementations have been designed to work with existing water filtration systems to provide an all-inclusive water solution. Implementations will enhance any existing water filtration system regardless of its end-user location. Implementations may be used with equipment without having to stop end users from consumption. Implementations may be easily installed and disposed of after depleted and require limited space to install.

The foregoing and other aspects, implementations, features, and advantages will be apparent from the DESCRIPTION and DRAWINGS, and from the CLAIMS.

DRAWINGS

Implementations will hereinafter be described in conjunction with the appended DRAWINGS, where like designations denote like elements.

FIG. 4 is a perspective view of another mechanical release system implementation.

FIG. 5. is a cross-sectional view of the mechanical release system implementation of FIG. 4 taken along line 5-5.

DESCRIPTION

A. Structure

Figure 1:
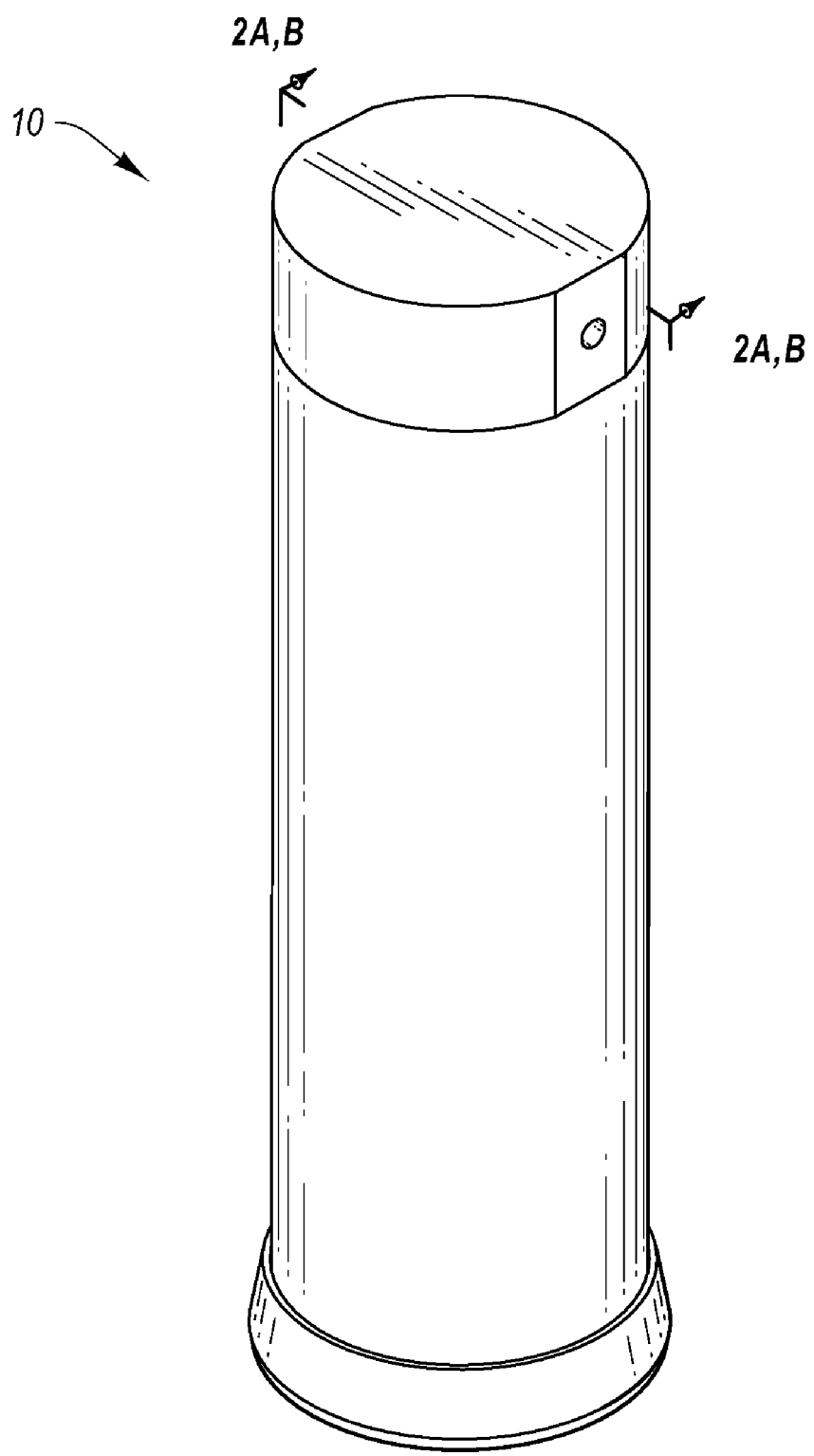
FIG. 1 is a perspective view of a mechanical release system implementation.
Figure 2A:
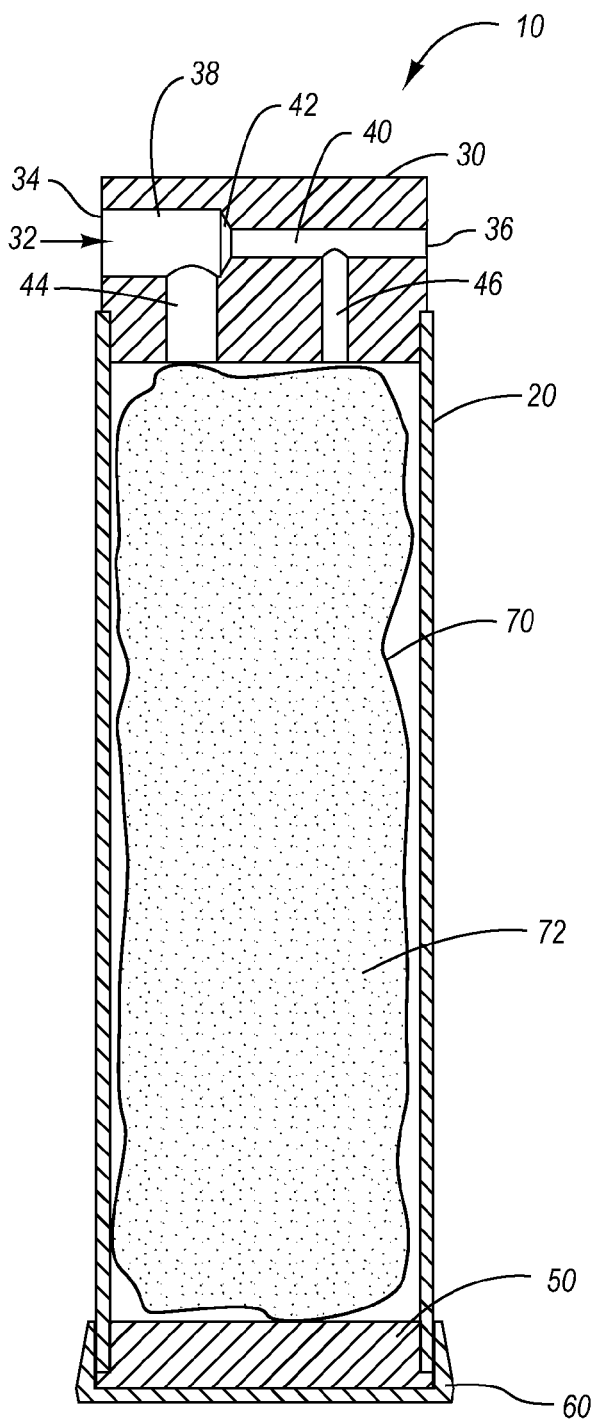
FIG. 2a is a cross-sectional view of the mechanical release system implementation of FIG. 1 taken along line 2A,B-2A,B.

There are a variety of mechanical release system implementations. Notwithstanding, with reference to FIGS. 1-3 and for the exemplary purposes of this disclosure, a mechanical release system implementation is depicted. This mechanical release system implementation includes pressure vessel 10 that includes body 20, head 30, end plug 50, end cap 60, and time-release pouch 70.

Body 20 is configured to hold time-release pouch 70. Body 20 is an annularly cylindrical housing defining an internal cavity and opposing upper and lower end openings.

Head 30 is configured to couple in-line and in fluid communication with a cold water feed line running from a water source to the equipment and divert a portion of water running through the feed line into and then out of body 20. Head 30 is generally cylindrical and defines through hole 32 extending from inlet 34 to outlet 36 on opposite sides of head 30. Through hole 32 is divided by circumferential partial rib/flow restrictor 42 into inlet section 38 and outlet section 40. Inlet section 38 has a first size (e.g., diameter) and outlet section 40 has a second size (e.g., diameter) less than the first size of inlet section 38.

Inlet 34 and outlet 36 couple with feed line tubing using appropriate fittings, such as, for example, fittings that are easy to install, disconnect and reuse, such as push-to-connect fittings having a body, a collet, and an O-ring, or compression fittings having a body, a ferrule, a nut, and a gripper. As such, inlet 34 and outlet 36 may be threaded or not to accommodate particular fittings depending on, among other considerations, the particular fittings employed. Two countersinks may be defined in opposite sides of head 30, one surrounding inlet 34 and the other surrounding outlet 36. The countersinks provide a suitable surface to seat the fittings and prevent leakage.

Head 30 also defines through hole/inlet port 44 and through hole/outlet port 46 on opposite sides of flow restrictor 42 extending downwardly from inlet section 38 and outlet section 40 respectively out the bottom of head 30. Both inlet port 44 and outlet port 46 are in fluid communication with through hole 32 and the internal cavity of body 20 when pressure vessel 10 is assembled together. Inlet port 44 has a first size (e.g., diameter) and outlet port 46 has a second size (e.g., diameter) less than the first size of inlet port 44.

Head 30 also defines a shoulder that only allows the lower portion of head 30 to slip fit within the upper end opening of body 20. Alternatively, the lower portion of head 30 and the upper end opening of body 20 may each be threaded to provide for a threaded fit. A gasket or O-ring could also be provided to form a seal between the shoulder of head 30 and the top of body 20. Such a threaded fitting would provide for a true replaceable, cartridge-type arrangement allowing for head 30 to remain installed to a feed line and the rest of pressure vessel 10 or only time-release pouch 70 to be discarded and replaced as needed.

End plug 50 is generally cylindrical and defines a shoulder that only allows the upper portion of end plug 50 to slip fit within the lower end opening of body 20. Alternatively, the upper portion of end plug 50 and the lower end opening of body 20 may each be threaded to provide for a threaded fit. A gasket or O-ring could also be provided to form a seal between the shoulder of end plug 50 and the bottom of body 20. Such a threaded fitting would provide for an arrangement allowing for head 30 and body 20 to remain installed to a feed line and time-release pouch 70 to be discarded and replaced as needed.

End cap 60 is configured to serve as a support stand and a non-skid surface to keep pressure vessel 10 upright if it is installed on the floor as opposed to being mounted on a wall or other surface for example. End cap 60 also serves to cover up the coupling of end plug 50 and body 20 to provide a clean appearance as well as other trade dress purposes.

Time-release pouch 70 is configured to hold and release over time composition 72 as it mixes with redirected water from the feed line to prevent the build-up of scale. Composition 72 comprises a proprietary blend of biodegradable citric acid ($H_3C_6H_5O_7$) and polyphosphate ($PO_4$) or other phosphates known as Citryne™. Citric acid is an FDA approved food product and polyphosphate is an NSF certified material for drinking water applications. Without being bound by theory, it is believed the phosphates serve a dual purpose of cleaning as well as buffering, and the chelating agent citric acid serves the dual function of dissolving scale and preventing precipitation of phosphates.

Many additional implementations are possible.

For the exemplary purposes of this disclosure and referring to FIGS. 4-5, another mechanical release system implementation is depicted. This mechanical release system implementation comprises pressure vessel 12 which is substantially similar to pressure vessel 10 previously described. The principal difference between them relates to their respective heads. In particular, pressure vessel 12 includes head 80.

Head 80 is configured to couple in-line and in fluid communication with a cold water feed line running from a water source to the equipment and divert a portion of water running through the feed line into and then out of body 20. Head 80 is generally cylindrical and defines through hole 82 extending from inlet 84 to outlet 86 on opposite sides of head 80. Through hole 82 is divided by circumferential rib/flow restrictor 92 into inlet section 88 and outlet section 90. Inlet section 88 has a first size (e.g., diameter) and outlet section 90 has a second size (e.g., diameter) equal to the first size of inlet section 88.

Inlet 84 and outlet 86 couple with feed line tubing using appropriate fittings, such as, for example, fittings that are easy to install, disconnect and reuse, such as push-to-connect fittings having a body, a collet, and an O-ring, or compression fittings having a body, a ferrule, a nut, and a gripper. As such, inlet 84 and outlet 86 may be threaded or not to accommodate particular fittings depending on, among other considerations, the particular fittings employed. Two countersinks may be defined in opposite sides of head 80, one surrounding inlet 84 and the other surrounding outlet 86. The countersinks provide a suitable surface to seat the fittings and prevent leakage.

Head 80 also defines through hole/inlet port 94 and through hole/outlet port 96 on opposite sides of flow restrictor 92 extending downwardly from inlet section 88 and outlet section 90 respectively out the bottom of head 80. Both inlet port 94 and outlet port 96 are in fluid communication with through hole 82 and the internal cavity of body 20 when pressure vessel 12 is assembled together. Inlet port 94 has a first size (e.g., diameter) and outlet port 96 has a second size (e.g., diameter) equal to the first size of inlet port 94.

Head 80 also defines a shoulder that only allows the lower portion of head 80 to slip fit within the upper end opening of body 20. Alternatively, the lower portion of head 80 and the upper end opening of body 20 may each be threaded to provide for a threaded fit. A gasket or O-ring could also be provided to form a seal between the shoulder of head 80 and the top of body 20. Such a threaded fitting would provide for a true replaceable, cartridge-type arrangement allowing for head 80 to remain installed and the rest of pressure vessel 12 to be discarded and replaced as needed.

For the exemplary purposes of this disclosure, still other mechanical release system implementations may comprise a pressure vessel which is similar to pressure vessels 10 and 12 previously described. The principal difference between them relates to their respective heads. In particular, these alternative pressure vessels include heads that have various combinations of sized ports and through holes. For example, in some pressure vessels the inlet section and the outlet section are the same size (e.g., diameter), while the inlet port has a first size (e.g., diameter) and the outlet port has a second size (e.g., diameter) less than the first size of the inlet port. In other pressure vessels, the inlet section has a first size (e.g., diameter) and the outlet section has a second size (e.g., diameter) less than the first size of the inlet section, while the inlet port and the outlet port are the same size (e.g., diameter).

For the exemplary purposes of this disclosure, still other mechanical release system implementations may comprise a pressure vessel which is similar to pressure vessels 10 and 12 previously described. The principal difference between them relates to their respective heads. In particular, these alternative pressure vessels each include a head defining a pair of spaced apart through holes (an inlet port and an outlet port) extending downwardly from the top of the head to the bottom of the head. Both the inlet port and the outlet port are in fluid communication with the internal cavity of the body when the pressure vessel is assembled together.

The inlet port and the outlet port couple with first ends of a pair of distribution tubes using appropriate fittings, such as, for example, fittings that are easy to install, disconnect and reuse, such as push-to-connect fittings having a body, a collet, and an O-ring, or compression fittings having a body, a ferrule, a nut, and a gripper. As such, the inlet port and the outlet port may be threaded or not to accommodate particular fittings depending on, among other considerations, the particular fittings employed.

Second ends of the distribution tubes are coupled to a flow restricting device that is coupled in-line and in fluid communication with a cold water feed line running from a water source to the equipment. The flow restricting device diverts a portion of water running through the feed line into and then out of the body through the distribution tubes and inlet and outlet ports. Specifically, flow restricting device defines a through hole extending from an inlet to an outlet on opposite sides of the flow restricting device. The through hole is divided by a flow restrictor into an inlet section and an outlet section. The second ends of the distribution tubes are coupled on opposite sides of the flow restrictor to and in fluid communication with the inlet section and the outlet section respectively.

For the exemplary purposes of this disclosure, yet other mechanical release system implementations may comprise bodies and end plugs that are integrally joined together and form unitary housings. Even other mechanical release system implementations may comprise any component combination of the foregoing implementations.

Further implementations are within the CLAIMS.

B. Specifications, Materials, Manufacture, and Assembly

It will be understood that mechanical release system implementations are not limited to the specific components disclosed herein, as virtually any components consistent with the intended operation of a mechanical release system implementation may be utilized. Thus, for example, although particular components for mechanical release system implementations are disclosed, such components may comprise any shape, size, style, type, model, version, measurement, concentration, material, quantity, and/or the like consistent with the intended operation of a mechanical release system implementation. Implementations are not limited to uses of any specific components, provided that the components selected are consistent with the intended operation of a mechanical release system implementation.

Accordingly, for the exemplary purposes of this disclosure, and not by way of limitation, different mechanical release system implementations may have a flow rate of about 5.5 GPM and be rated up to about 100 degrees Fahrenheit and about 80-125 psi. Some mechanical release system implementations may have up to a six month life span (processing about 40,000 gallons of water).

In addition, TABLE 1 displays some other specifications for different models of mechanical release system implementations sold by Terry, LLC of Chandler, Ariz. In TABLE 1, "EC" stands for easy connect (e.g., push-to-connect) and "NPT" stands for national pipe thread.

TABLE 1

| Model | Fitting Size | Flow Restrictor Size | Inlet Port Size | Citryne™ Amount | Body Size |
|---|---|---|---|---|---|
| SMK12 | ¼" EC | 3⁄16" | 1⁄16" | 8 oz | 2" |
| SMK1 | 3⁄8" EC | ¼" | 1⁄8" | 20 oz | 2" |
| SMK2-12 | ½" EC | 5⁄16" | 3⁄16" | 3 lbs | 3" |
| SMK2-14 | ¼" EC | 3⁄16" | 1⁄16" | 3 lbs | 3" |
| SMK3 | ½" EC | 5⁄16" | 3⁄16" | 5 lbs | 4" |
| SMK4-12 | ½" EC | 5⁄16" | 3⁄16" | 8 lbs | 4" |
| SMK4-34 | ¾" NPT | 7⁄16" | 5⁄16" | 8 lbs | 4" |
| SMK4-1 | 1" NPT | 5⁄8" | 3⁄8" | 8 lbs | 4" |
| SMK5-1 | 1" NPT | 5⁄8" | 3⁄8" | 18 lbs | 4" |
| SMK5-2 | 2" NPT | 13⁄16" | 3⁄16" | 18 lbs | 4" |
| SM1/SM1C | ½" EC | 5⁄16" | 3⁄16" | 3 lbs | 3" |
| SM2/SM2C | ½" EC | 5⁄16" | 3⁄16" | 5 lbs | 4" |
| TM1 | ¾" NPT | 9⁄16" | 3⁄16" | 3 lbs | 3" |
| TM2 | 1" NPT | 13⁄16" | 3⁄16" | 3 lbs | 3" |

Again, for the exemplary purposes of this disclosure, the components defining any mechanical release system implementation may be formed of any of many different types of materials or combinations thereof that can readily be formed into shaped objects provided that the materials and components selected are consistent with the intended operation of a mechanical release system. For example, the components may be formed of: rubbers (synthetic and/or natural), neoprene, and/or other like materials; glasses (such as fiberglass), carbon-fiber, aramid-fiber, any combination thereof, and/or other like materials; polymers such as thermoplastics (such as ABS, PVC, Fluoropolymers, Polyacetal, Polyamide, Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any mechanical release system implementation may be purchased pre-manufactured or manufactured separately and then assembled together. However, any or all of the components may be manufactured simultaneously and integrally joined with one another. The various implementations may be manufactured using conventional procedures as added to and improved upon through the procedures described in this disclosure. Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. Components that are manufactured separately may then be coupled with one another in any manner, such as by/with adhesive, a weld, a fastener (e.g., a bolt, a nut, a screw, a nail, a rivet, a pin, and/or the like), a fitting, any combination thereof, and/or the like for example, depending on, among other considerations, the particular material(s) forming the components.

Figure 3:
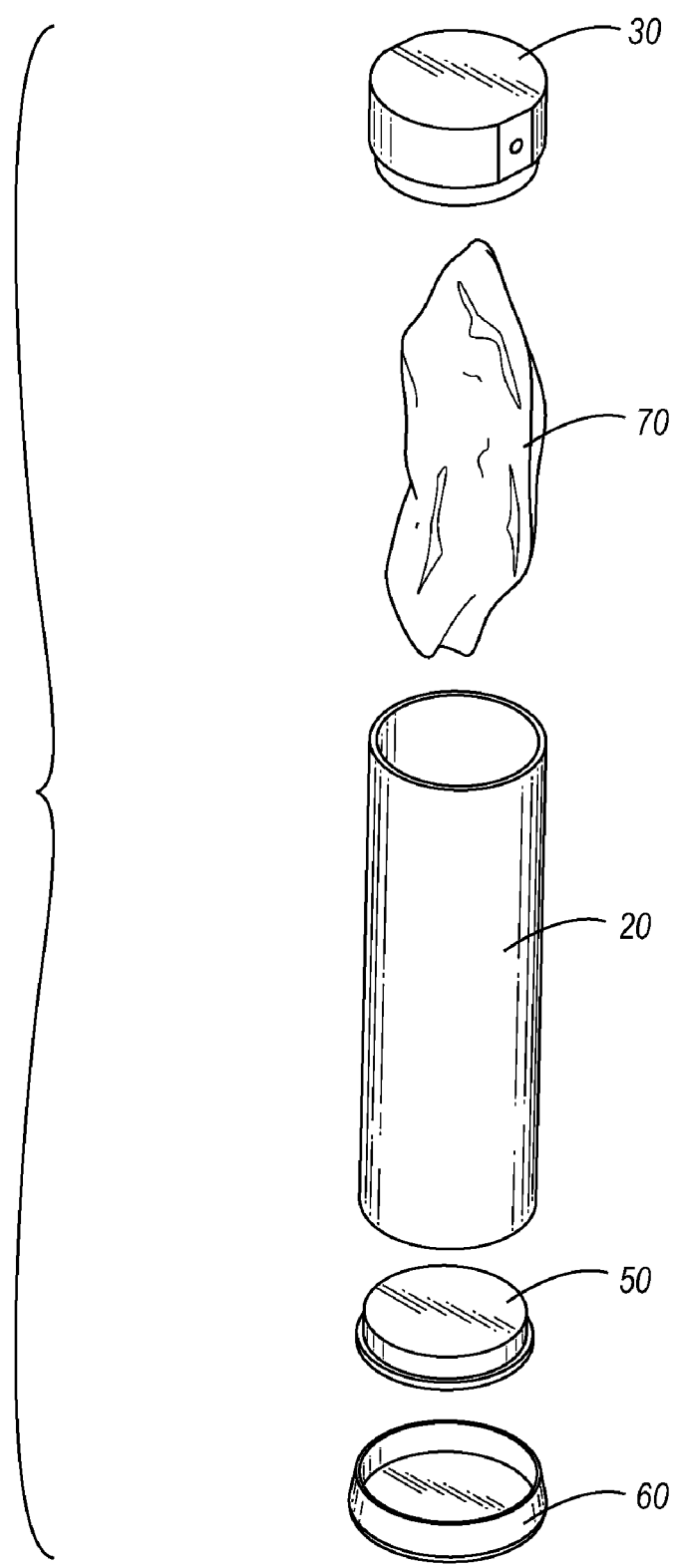
FIG. 3 is an exploded view of the components of the mechanical release system implementation of FIG. 1.

Accordingly, for the exemplary purposes of this disclosure, pressure vessel 10 may be assembled as depicted in FIG. 3 in the following manner. End plug 50 and then end cap 60 may be coupled to body 20. Time release pouch 70 may then be inserted into the internal cavity of body 20. Next, head 30 may be coupled to body 20. Finally, fittings may be coupled to inlet 34 and outlet 35 respectively.

While the assembly of pressure vessel 10 has been described in a particular sequence of steps with reference to the drawing figures, it will be understood that the assembly of pressure vessel 10 is not limited to the specific order of steps as disclosed. Any steps or sequence of steps of the assembly of pressure vessel 10 indicated herein are given as examples of possible steps or sequence of steps and not as limitations, since various assembly processes and sequences of steps may be used to assemble pressure vessel 10. Other pressure vessel implementations, such as pressure vessel 12, may be assembled in similar manners.

C. Use

Mechanical release system implementations are particularly useful in eliminating scale conditions (e.g., calcium carbonate ($CaCO_3$)) in water used in equipment for restaurants, hospitals, schools, commercial kitchens, convenience stores, cooling towers and many other applications, including heat exchange applications. However, implementations are not limited to uses relating to the foregoing. Rather, any description relating to the foregoing is for the exemplary purposes of this disclosure, and implementations may also be used with similar results for a variety of other applications.

For the exemplary purposes of this disclosure, mechanical release system implementations may be installed in the following manner. The pressure vessel may first be attached to a mounting bracket or panel if needed for the particular application. Regardless, once the water supply is turned off to the feed line, the pressure vessel, or the mounting bracket or panel as the case may be, may be positioned (whether attached to a wall or placed on the floor) vertically, which helps the system to function properly. Then, the inlet and the outlet of the head may be coupled with the feed line tubing using appropriate fittings as described previously (push-to-connect fittings, compression fittings, or the like). At this point, the water supply can be turned back on.

Once installed, mechanical release system implementations may be used to eliminate scale concerns from water by controlling the water before it enters the equipment. Mechanical release system implementations work both while the equipment is operating (the water is flowing) and while the equipment is stopped (the water is stopped).

Figure 2B:
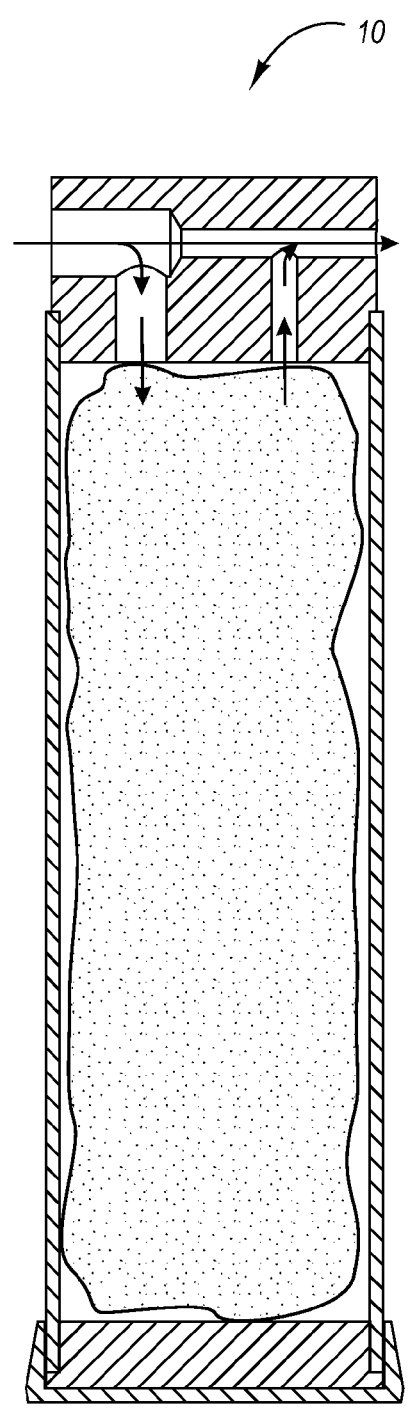
FIG. 2b is a cross-sectional view of the mechanical release system implementation of FIG. 1 taken along line 2A,B-2A,B depicting water flow through the system.

Accordingly, for the exemplary purposes of this disclosure, FIG. 2B illustrates water flow (arrows) through pressure vessel 10 when it is connected in-line with the cold water feed line of equipment. As water flows, a portion of it is redirected by flow restrictor 42 through inlet port 44 into body 20. The redirected water mixes with composition 72 in time-release pouch 70 to neutralize scale causing water conditions, such as calcium (e.g., calcium carbonate ($CaCO_3$)) and magnesium for example. Without being bound by theory, likely through upwards pressure and/or a venturi effect, the treated water is then carried through outlet port 46 into outlet section 40 of through hole 32 where it exits outlet 36 and enters the tubing and moves on to the equipment. Likely through a diffusion or osmotic effect, when the equipment is not running and the water flow is stopped, previously redirected water in body 20 as well as stagnate water in the tubing becomes saturated by composition 72. When the water flow resumes, the saturated water is moved to the equipment.

The invention claimed is:

1. A chemical release system comprising:
    a pressure vessel comprising:
        a head comprising:
            a through hole extending from an inlet to an outlet on opposite sides of the head, the through hole divided by at least a circumferential partial rib into an inlet section and an outlet section wherein the inlet section has a first size and the outlet section has a second size less than the first size of the inlet section;
            an inlet port and an outlet port on opposite sides of the circumferential partial rib extending downwardly from the inlet section and the outlet section respectively out a bottom of the head;
            wherein the inlet port has a first size and the outlet port has a second size that is one of less than the first size of the inlet port and equal to the first size of the inlet port; and
            wherein the outlet port comprises a single diameter as it extends from the outlet section out the bottom of the head and;
            wherein the inlet port and outlet port exit out the bottom of the head in substantially a same plane.

2. The chemical release system of claim 1, wherein the head further defines a shoulder at a lower portion of the head and the lower portion of the head couples to a body substantially up to the shoulder.

3. A chemical release system comprising:
    a pressure vessel comprising:
        a body defining an internal cavity and opposing upper and lower end openings;
        a head coupled to the upper end opening of the body, the head configured to couple in-line and in fluid communication with a cold water feed line running from a water source to equipment and to divert a portion of the water into and then out of the body, and the head comprising:
            a through hole extending from an inlet to an outlet on opposite sides of the head, the through hole divided by at least a circumferential partial rib into an inlet section and an outlet section, wherein the inlet section has a first size and the outlet section has a second size less than the first size of the inlet section; and an inlet port and an outlet port on opposite sides of the circumferential partial rib extending downwardly from the inlet section and the outlet section, respectively, out a bottom of the head, both the inlet port and the outlet port in fluid communication with the through hole and the internal cavity of the body;

wherein the inlet port has a first size and the outlet port has a second size that is one of less than the first size of the inlet port and equal to the first size of the inlet port; and wherein the outlet port comprises a single diameter as it extends from the outlet section out the bottom of the head and;

wherein the inlet port and outlet port exit out the bottom of the head in substantially in a same plane; and an end plug coupled to the lower end opening of the body; and a time-release pouch holding a composition that prevents the build-up of scale, the time-release pouch disposed within the internal cavity of the body.

4. The chemical release system of claim 3, wherein the head and the end plug are generally cylindrical and the body is annularly cylindrical.

5. The chemical release system of claim 4, wherein the head further defines a shoulder at a lower portion of the head and the lower portion of the head is coupled to a body substantially up to the shoulder.

6. The chemical release system of claim 4, wherein the end plug defines a shoulder at an upper portion of the end plug and the upper portion of the end plug is coupled to the body substantially up to the shoulder.

\* \* \* \* \*